United States Patent [19]
Eckberg et al.

[11] Patent Number: 5,814,679
[45] Date of Patent: Sep. 29, 1998

[54] PREMIUM RELEASE PHOTO-CURABLE SILICONE COMPOSITIONS

[75] Inventors: Richard P. Eckberg, Saratoga Springs; Robert F. Agars, Clifton Park, both of N.Y.

[73] Assignee: General Electric Company, Waterford, N.Y.

[21] Appl. No.: 733,435

[22] Filed: Oct. 18, 1996

[51] Int. Cl.$^6$ .......................... C08G 77/14; C08G 59/62; C08G 59/30
[52] U.S. Cl. .......................... 522/31; 522/148; 522/170; 528/18; 528/33; 528/31; 528/40; 428/447
[58] Field of Search .......................... 522/31, 148, 170; 528/18, 23, 33, 40, 31; 525/477, 476; 428/447

[56] References Cited

U.S. PATENT DOCUMENTS 5,721,290  2/1998  Eckberg et al. .......................... 522/148

*Primary Examiner*—Susan W. Berman
*Attorney, Agent, or Firm*—Kenneth S. Wheelock

[57] ABSTRACT

Carbinol functionalized silicones provide improved release properties to epoxy silicone photo-curable release compositions, by co-photo-curing with the epoxy functionalized silicone.

20 Claims, No Drawings

PREMIUM RELEASE PHOTO-CURABLE SILICONE COMPOSITIONS

FIELD OF THE INVENTION

This invention relates to improved ultraviolet light curable silicone release coating compositions. More particularly, it relates to blends of photo-curable silicone compositions with long chain silicone compounds that contain carbinol functionalities. The long chain carbinol containing silicones of the present invention co-polymerize or co-cure with epoxy functional photo curable silicones thereby permitting the formulation of premium release photo-curable silicone compositions.

BACKGROUND OF THE INVENTION

Silicone compositions have long been used for rendering surfaces non-adherent to materials which would normally adhere thereto. For a long time, it was necessary that these silicone coatings be applied as a dispersion within a solvent in order to control the viscosity of the coating material so as to be suitable for coating applications. However, although the solvent aids in the application of the coating, it is an inefficient process as the solvent must thereafter be evaporated. The evaporation of solvent requires large expenditures of energy. Additionally, pollution abatement procedures require that solvent vapors be prevented from escaping into the air. Removal and recovery of all of the solvent entails considerable expenditure for apparatus and energy.

It has been thus noted that there is a need to provide a solventless coating composition that will, however, remain easy to apply to the substrate. Such solventless coating compositions are sometimes referred to as "100% solids" compositions. The absence of solvent in such compositions lowers the amount of energy required to effect a cure and eliminates the need for expensive pollution abatement equipment. The present invention provides an improved solvent-less pre-crosslinked epoxy functional polydiorganosiloxane fluid that will cure to a non-adherent surface when combined with an effective amount of a soluble diaryl iodonium salt and exposed to ultraviolet radiation.

Epoxy functional silicone release agents are constrained by the need to balance both fast cure and photocatalyst miscibility with a low force or premium release. Good release performance coupled with an efficient photocure response is obtained when the epoxy equivalent weight is held between about 800 and about 1600. If the epoxy group in the epoxy-silicone is derived from 4-vinylcyclohexene oxide (VCHO), then the organofunctional content of the silicone must therefor vary between about 8 and about 16 weight percent. A high epoxy content, one that is above about 16 weight percent in cured epoxy-silicone coatings fails to release properly, while low epoxy content, below about 8 weight percent in cured epoxysilicone coatings results in a slow curing coating that suffers from an additional problem in that the iodonium catalyst tends to rapidly settle out of the silicone fluid upon standing, as the organofunctionality in the silicone tends to assist solubilization of the iodonium salt.

Release coatings are useful for many applications whenever it is necessary to provide a surface or material that is relatively non-adherent or abhesive to other materials which would normally adhere thereto. Silicone paper release compositions are widely used as coatings which release pressure-sensitive adhesives for labels, decorative laminates, transfer tapes, etc. Silicone release coatings on paper, polyethylene, Mylar® and other such substrates are also useful as non-stick surfaces for food handling and industrial packaging applications.

For example, when labels are coated with an adhesive, it is desirable that the paper backing be easily peeled away from the label when it is ready for use, yet the adhesive quality of the label should not be derogated by the fact that it has been peeled away from the substrate upon which it was stored. The same principle applies to certain types of adhesive tapes which come in rolls. It is necessary that the tape unroll easily and still maintain its adhesive characteristics. This can be accomplished by coating the non-adhesive side of the tape with a silicone release composition that will come into contact with the adhesive as the roll of tape is manufactured.

Silicone release compositions are often sold as dispersions of reactive polysiloxanes in organic solvents such as toluene, or as emulsions in water. A cross-linking catalyst, also known as the curing agent, is then added to the polysiloxane-solvent mixture. The coating composition is applied to a substrate which is passed through an oven to evaporate the carrier fluid and cure the silicone to a non-adherent or "abhesive" surface. As noted above, this process is quite energy intensive since it requires high oven temperatures to evaporate the solvent and effect the cure at commercially useful speeds.

Use of these solvent based products is becoming increasingly unattractive because of rising energy costs and stringent regulation of solvent emissions into the atmosphere. Other solventless silicone release compositions such as that described in U.S. Pat. No. 4,256,870 herein incorporated by reference have addressed the environmental problem of hydrocarbon emission but still require high oven temperatures for proper cure.

Optimum energy savings as well as necessary ecological considerations are both served by radiation curable compositions. Specifically, an ultraviolet (UV) radiation curable 100% solids silicone release system eliminates the need for high oven temperatures and for expensive solvent recovery systems, and is, therefore, a useful and commercially desirable product.

UV curable silicone compositions are not unknown. A patent issued to R. V. Viventi, U.S. Pat. No. 3,816,282, Jun. 11, 1974, and assigned to the General Electric Company, describes a room temperature vulcanizable silicone composition (RTV) in which a mercaptoalkyl substituent attached to polysiloxanes add to vinyl functional siloxanes in a free-radical process upon UV irradiation in the presence of free-radical type photosensitizers. The particular compositions described by Viventi cure too slowly to be useful for paper release applications. Furthermore, the use of mercaptoalkyl photoreactive substituents gives rise to offensive odors both in product manufacture and in cured materials.

Ultraviolet radiation will initiate free-radical crosslinking in the presence of common photosensitizers which are well-known to persons familiar with the art of radiation curing mechanisms. However, silicone compositions bearing acrylate or other functional groups which undergo free radical polymerization that utilize photosensitizers (such as benzophenone) as a curing agent also require stabilizers (such as hydroquinone) to prevent premature reaction and provide reasonable shelf-life.

Commonly available photosensitizers are only slightly soluble in polydimethylsiloxane fluids which are the basic starting materials for silicone coating compositions. Low solubility of these photosensitizers causes problems in selection of the necessary ingredients. A further difficulty inherent in free-radical systems is oxygen inhibition which necessitates that the coated substrates be under an inert atmosphere while undergoing irradiation in order to cure within a reasonable amount of time. Use of an inert atmosphere adds a complication and an expense to the coating and curing process.

It has previously been discovered that UV curable epoxy functional silicones which are suitable for release coating applications fall into a narrow range of epoxy content and viscosity. The limits to these parameters are imposed by the necessity of coating 0.5 to 2.0 micron layers of these silicone fluids onto various substrates, and by the necessity for these formulations to cure quickly upon exposure to UV radiation and to adhere well to the substrate.

The requirement that these epoxy functional silicones be applied in thin coats dictates that the fluids be of low viscosity such as, for example, approximately 100 to 2,000 centistokes. Consequently, the epoxy functional silicones typically must be low molecular weight fluids. Also, the efficiency of the curing catalyst must be high in order to provide sufficient cross-linking and the formation of a tight, smear-resistant coating which adheres well to the substrate.

The requirement for a highly efficient photo initiator severely restricts the structure of the catalyst since it also must be capable of dissolving or dispersing well in the epoxy functional silicone fluid. U.S. Pat. No. 4,310,469 herein incorporated by reference discloses a UV initiated cationic ring opening curable curing mechanism for dimethyl epoxy chain-stopped linear polydimethylsiloxane fluids utilizing bisaryliodonium salts of the following formula, $[(R_n'-Ph)_2I]+X-$ wherein $X=SbF_6$, $PF_6$ or $BF_4$ and wherein R' is a $C_{(4-20)}$ organo radical selected from alkyl and haloalkyl and mixtures thereof and n is a whole number equal to 1 to 5, inclusive. The catalysts described by Crivello are thick, high viscosity liquids or waxy solids which disperse poorly in the low molecular weight epoxy functional silicones utilized by the present invention. These catalysts exhibit the typical solubility characteristics of diaryliodonium salts, namely, being soluble in polar organic solvents such as chloroform and acetone but insoluble in non-polar organic solvents such as pentane, hexane and petroleum ether. Such solubility behavior severely limits the utility of these salts for initiating the rapid photocuring of epoxy functional silicone paper release compositions.

Although Crivello discloses that R may equal organo radicals selected from alkyl, haloalkyl and branched alkyl groups containing from 4 to 20 carbon atoms, the unique characteristics of "linear alkylate" bis(dodecylphenyl) iodonium salts such as are disclosed by the present invention are not recognized by Crivello. These bis(dodecylphenyl) iodonium salts will rapidly dissolve in the polysiloxane base polymer fluid and disperse throughout, thereby being an efficient photo initiator agent. Such salts are particularly well adapted for use with the novel epoxy functional silicone coating compositions herein provided, as taught in U.S. Pat. No. 4,279,717.

Epoxy functional silicone paper release coating compositions must ordinarily have epoxy contents of less than approximately 16 weight percent because of the end uses to which such coatings will be put, namely, to serve as non-adherent surfaces capable of releasing aggressive pressure sensitive adhesives. When the epoxy content of the silicone compositions greater than about 16 weight percent, excessive force is required to remove adhesive coated articles from the cured silicone coatings. Note, however, that this may be a useful characteristic whenever it is desirable to selectively control the release characteristics of an adhesive.

Cationic photocurable silicone release coatings are subject to some significant limitations that prevent epoxysilicone release coating from achieving the low, or premium, release associated with thermally curable solventless, emulsion, or solvent borne addition cure silicone release coatings. These limitations are a consequence of the need for a high level of reactivity coupled with photocatalyst compatibility in the photocurable silicone composition which when taken together require a certain minimum level of a polar epoxy functionality in what would otherwise be a nonfunctional polydiorganosiloxane (typically a polydimethylsiloxane).

The use of cycloaliphatic epoxy-functionalized polyorganosiloxanes results in polycycloalkylether crosslinks, e.g. cyclohexene oxide functionalized silicone forming cyclohexyl ether crosslinks. The polycycloalkylether crosslinks resulting from photocuring create high glass transition temperature, high surface energy domains in the photocured epoxysilicone release coating. These high glass transition temperature, high energy domains tightly bind pressure sensitive adhesives that are in contact with them. The polyorganosiloxane component of the photocured epoxysilicone coating has a lower surface energy and thus there is usually a driving force that orients the polyorganosiloxane component of the cured epoxysilicone so that the surface energy (or alternatively the surface free energy) of the photocured epoxysilicone is minimized. However, there is usually sufficient conformational flexibility, even in the photocured crosslinked epoxysilicone, that some of the polycycloalkylether crosslinks either migrate to the surface of the coating or are already present in the surface of the coating. Consequently the low release force surface presented by the polyorganosiloxane components of the polymeric network is interrupted by high release force domains due to the presence at the surface of the polycycloalkylether crosslinks. By comparison to thermal release coatings, a photocured epoxysilicone thus almost always exhibits tighter release force.

This analysis suggests that the release force of photocured epoxysilicones may be decreased by reducing the crosslink density. Typically crosslink density may be reduced in one of two fashions. The first is to limit the amount of epoxy functionality present in the precursor molecules. This approach leads to poor cationic photocatalyst miscibility in the precursor silicone phase and to slow cure rates. The second approach is to increase the average chain length of the molecules. The drawbacks associated with this approach are that as the chain length increases, controlling the average molecular weight and the molecular weight distribution becomes progressively more difficult, leading to difficulties in reproducing the polymer synthesis from batch to batch. The higher viscosities associated with the longer chain length require that the more highly polymerized epoxysilicones be blended with lower molecular weight silicones or reactive diluents to permit coating without the use of solvents.

SUMMARY OF THE INVENTION

We now disclose that lower release force photocured epoxysilicone coatings may be prepared through the use of a new composition of matter, a di- or polycarbinol terminated polydiorganosiloxane by incorporating the di- or polycarbinol terminated polyorganosiloxane into a photocurable epoxysilicone composition.

The present invention thus provides for a photo-curable epoxy silicone composition comprising:

(a) an epoxy functional silicone;
(b) a carbinol containing siloxane of the general formula:

$$M_e M^C_f D_p D^C_q T_r T^C_s Q_t$$

with the subscripts e, f, p, q, r, s and t being zero or positive subject to the limitation that at least one of the subscripts f, q, and s are non-zero and positive, where $Q=SiO_{4/2}$;

$M=R^1R^2R^3SiO_{1/2}$,
with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;

$M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;

$D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;

$D^C=R^1R^5SiO_{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;

$T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;

$T^C=R^5SiO_{3/2}$, with
$R^5$ a monovalent radical, independently selected for each $M^C$, $D^C$, and $T^C$, having the formula:

—$R^1R^2C$—$CHR^3R^4$ where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

$C_aH_{2a+1-b}G_\theta A(OH)_b$, with the subscript a an integer of one or greater and the subscript b a positive integer subject to the limitation that b is less than or equal to 2a+1; and $C_cH_{2c-7-d}G_\theta A(OH)_d$, with the subscript c being an integer 6 or greater and the subscript d a positive integer subject to the limitation that d is less than or equal to 2c−7 where $A=(((CH2)_\alpha O)_\beta ((CH2)_\gamma O)_\pi)$ where the subscripts $\alpha$, $\beta$, $\gamma$, and $\pi$ are zero or positive subject to the limitation that if $\alpha$ is zero $\beta$ is zero and subject to the limitation that if $\gamma$ is zero $\pi$ is zero and where $G_\theta$ is divalent O or divalent S and the subscript $\theta$ is zero or one; and (c) a photo-catalyst. The present invention further provides for a cure epoxy silicone composition comprising the reaction product or products of the curable composition.

Preferably the epoxy silicone composition is selected from the group consisting of
$MD_xD^E_yQ_zT_uD^{Rf}_jD^A_kD^P_l(D'(CH(R)CH_2O)_m)_nD^B_pM$,
$M^ED_xD^E_yQ_zT_uD^{Rf}_jD^A_kD^P_l(D'(CH(R)CH_2O)_m)_nD^B_pM^E$,
$M^ED_xD^E_yQ_zT_uD^{Rf}_jD^A_kD^P_l(D'(CH(R)CH_2O)_m)_nD^B_pM$,
and mixtures thereof;
where
$M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_g)((CH_3)(CH_2)_h)SiO_{2/2}$,
$D^E=(C_6H_9O(CH_2)_2)(CH_3)SiO_{2/2}$,
$D^R_f=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$,
where R is selected from the group consisting of hydrogen, methyl, and ethyl, and where j, k, l, m, n, p, x, y, z, and u are positive integers and g, h, k, l, n, p, u and z may be zero or positive integers and wherein said epoxy functional silicone has a viscosity ranging from about 100 to about 100,000 centistokes at 25° C.

Thus the present invention also provides for the cured epoxy silicone composition comprising the reaction product of:

(a) an epoxy functional silicone; and
(b) a carbinol containing siloxane of the general formula:

$$M_e M^C_f D_o D^C_q T_r T^C_s Q_t$$

with the subscripts e, f, o, q, r, s and t being zero or positive subject to the limitation that at least one of the subscripts f, q, and s are non-zero and positive, where $Q=SiO_{4/2}$;

$M=R^1R^2R^3SiO_{1/2}$,
with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;

$M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;

$D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;

$D^C=R^1R^5SiO_{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;

$T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;

$T^C=R^5SiO_{3/2}$, with $R^5$ a monovalent radical, independently selected for each $M^C$, $D^C$, and $T^C$, having the formula:

$-R^1R^2C-CHR^3R^4$ where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

$C_aH_{2a+1-b}A(OH)_b$, with the subscript a an integer of one or greater and the subscript b a positive integer subject to the limitation that b is less than or equal to 2a+1; and $C_cH_{2c-7-d}A(OH)_d$, with the subscript c being an integer 6 or greater and the subscript d a positive integer subject to the limitation that d is less than or equal to 2c−7, where $A=(((CH2)_\alpha O)_\beta((CH2)_\gamma O)_\pi)$ where the subscripts $\alpha$, $\beta$, $\gamma$, and $\pi$ are zero or positive subject to the limitation that if $\alpha$ is zero $\beta$ is zero and subject to the limitation that if $\gamma$ is zero $\pi$ is zero.

In order to make the compositions of the present invention, the present invention further provides for a process for lowering the release force of a silicone release composition comprising:

(a) preparing an epoxy silicone selected from the group of epoxy silicones consisting of:

$MD_xD^E_yQ_zT_uD^{Rf}_jD^A_kD^P_l(D'(CH(R)CH_2O)_m)_nD^B_pM$,
$M^ED_xD^E_yQ_zT_uD^{Rf}_jD^A_kD^P_l(D'(CH(R)CH_2O)_m)_nD^B_pM^E$,
$M^ED_xD^E_yQ_zT_uD^{Rf}_jD^A_kD^P_l(D'(CH(R)CH_2O)_m)_nD^B_pM$, and mixtures thereof;

where
$M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_g)((CH_3)(CH_2)_h)SiO_{2/2}$,
$D^E=(C_6H_9O(CH_2)_2)(CH_3)SiO_{2/2}$,
$D^{Rf}=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, where R is selected from the group consisting of hydrogen, methyl, and ethyl, and where j, k, l, m, n, p, x, y, z, and u are positive integers and g, h, k, l, n, p, u and z may be zero or positive integers;

(b) preparing a carbinol functional silicone having the formula:

$M_eM^C_fD_oD^C_qT_rT^C_sQ_t$ with the subscripts e, f, o, q, r, s and t being zero or positive subject to the limitation that at least one of the subscripts f, q, and s are non-zero and positive, where $Q=SiO_{4/2}$;
$M=R^1R^2R^3SiO_{1/2}$,
with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;
$M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;
$D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;
$D^C=R^1R^5SiO_{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;
$T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;
$T^C=R^5SiO_{3/2}$, with
$R^5$ a monovalent radical, independently selected for each $M^C$, $D^C$, and $T^C$, having the formula:

$-R^1R^2C-CHR^3R^4$ where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

$C_aH_{2a+1-b}A(OH)_b$, with the subscript a an integer of one or greater and the subscript b a positive integer subject to the limitation that b is less than or equal to 2a+1; and $C_cH_{2c-7-d}A(OH)_d$, with the subscript c being an integer 6 or greater and the subscript d a positive integer subject to the limitation that d is less than or equal to 2c−7, where $A=(((CH2)_\alpha O)_\beta((CH2)_\gamma O)_\pi)$ where the subscripts $\alpha$, $\beta$, $\gamma$, and $\pi$ are zero or positive subject to the limitation that if $\alpha$ is zero $\beta$ is zero and subject to the limitation that if $\gamma$ is zero $\pi$ is zero; and (c) adding said carbinol functional silicone to said epoxy silicone producing thereby a silicone mixture;

(d) adding a photo-catalyst to said silicone mixture; and (e) irradiating said silicone mixture comprising a photo-catalyst with ultraviolet radiation or an electron beam thereby curing said silicone mixture whereby release force of the cured silicone mixture is lowered.

DETAILED DESCRIPTION OF THE INVENTION

The epoxy functional polydiorganosiloxane fluids provided by the instant invention are more specifically dialkylepoxysiloxy- or trialkylsiloxy chain-stopped polydialkyl-alkylepoxysiloxane copolymers that are co-cured in the presence of a carbinol containing polydiorganosiloxane.

The epoxy functionality is obtained when certain of the hydrogen atoms on the polysiloxane chain of the polydialkyl-alkyl hydrogen-siloxane copolymer are reacted with organic molecules that contain both an ethylenic unsaturation and epoxide functionality; via a hydrosilation addition reaction as taught in U.S. Pat. No. 5,258,480.

The ultraviolet light and/or electron beam curable epoxy-functional silicone fluid can therefor comprise an epoxy-functional dialkyl-epoxysiloxy- or trialkylsiloxy- chain stopped polydialkyl alkylepoxy siloxane copolymer fluid that is the product of sequential hydrosilation reactions involving a polydialkyl-alkyl hydrogen siloxane with a separate polydialkylsiloxane that includes ethylenically unsaturated groups, followed by reaction with an ethylenically unsaturated epoxide monomer wherein the resulting epoxy-silicone fluid is diluted with a vinyl ether monomer or oligomer, or an epoxy-functional polyorganosiloxane (or similar epoxysilicone) produced via hydrosilylation of an olefin epoxy compound with silyl hydride containing species.

The alkyl groups of the pre-cross linked polydialkyl-alkylepoxide siloxane are preferably methyl groups. The ethylenically unsaturated group containing polydialkylsiloxane is preferably a vinyl containing polydialkylsiloxane, most preferably a vinyldimethyl-siloxy- chain stopped polydimethylsiloxane. The ethylenically unsaturated epoxy or epoxide monomer is preferably an unsaturated cycloaliphatic epoxy compound such as 4-vinylcyclohexene oxide (VCHO), vinylnorbornenemonoxide, limonenemonoxide, or dicyclo-pentadienemonoxide.

The hydrosilation reactions used for pre-crosslinking and subsequent functionalization of silylhydride containing polysiloxanes are preferably catalyzed by trace amounts of Group VIII noble metal compounds. By Group VIII noble metals, applicants define the group to consist of the elements ruthenium, rhodium, palladium, osmium, iridium, and platinum.

The vinyl functional silicone employed in the pre-crosslinking network synthesis may be selected from the group consisting of dimethylvinylsiloxy chain stopped polydimethylsiloxane, dimethylvinylsiloxy chain stopped polydimethyl-methylvinyl siloxane, tetravinyl tetramethylcyclotetrasiloxane, and sym-tetramethyl divinyldisiloxane.

The hydrogen functional siloxane precursor fluid can be selected from the group consisting of tetrahydrotetramethylcyclotetrasiloxane, dimethylhydrogensiloxy chain stopped polydimethyl-methylhydrogen siloxane, trimethylsiloxy chain stopped polydimethyl-methylhydrogen siloxane, and sym-tetramethyldisiloxane.

We have discovered that when carbinol containing polydiorganosiloxanes are combined with epoxy silicones, that the two compositions photo-cure together providing a cross-linked solid silicone polymer that provides lower release force coatings.

Ultraviolet light curable or electron beam curable epoxy-functional silicone compositions of the instant invention may be applied to cellulosic or plastic film substrates including but not limited to supercalendered kraft (SCK) paper, glassine paper, polyethylene kraft (PEK) paper, polyethylene film, polypropylene film, and polyester film. A reaction, initiated by ultraviolet light, cures the liquid silicone release coating to form a solid non-adherent, i.e. abhesive, release surface on the substrate so coated.

Acrylate functional silicones, such as those taught in U.S. Pat. No. 5,034,491 are also photo-curable in the presence of photo-initiators. Photocurable acrylate silicone compositions that are photocurable in the presence of the more common free-radical photo-initiators typically require stabilizers, e.g. hydroquinone. Typical common photo initiators such as benzophenone and its derivatives are generally completely insoluble in silicone media, as are most stabilizers. Low solubility leads to problems as to an appropriate choice of these necessary additives. Another problem associated with free-radical photocure silicone systems is the cure inhibition brought about by the presence of oxygen, which requires that the coated substrate be under an inert atmosphere such as nitrogen while undergoing ultraviolet radiation for a prompt cure response. While maintaining an inert atmosphere in an ultraviolet or electron beam cure chamber is feasible, the requirement for an inert atmosphere adds complications and expense to a coating and curing process.

It has previously been discovered that ultraviolet and/or electron beam curable epoxy-silicone polymers such as those taught by Eckberg et al. in U.S. Pat. No. 4,279,717 are efficiently cured in the presence of certain compatible onium-type cationic photocure catalysts without being subject to the drawback of being inhibited in the presence of oxygen. These epoxy-silicone compositions are constrained within a narrow range of viscosity and epoxy content that is dictated by the need for a defect free coating that is about 0.5 to 2.0 micron thick coating of the polymers that can be applied to the substrate at high application speeds and by the necessity for these photocurable compositions to quickly photocure upon exposure to ultraviolet light while maintaining good adhesion to the substrate.

Three roll offset gravure or multi-roll film splitting application techniques commonly practiced for the high speed coating of solvent free silicones requires that the silicones be in the range of 100 to 3,000 centistokes viscosity at the temperature where applied, rapid cure requires sufficient amount of reactive oxirane be present in the epoxy-silicone molecule to facilitate onium-type catalyst dissolution and to ensure a high reactivity of the system. If too much oxirane is reacted into the silicone fluid composition a photo cured epoxy-silicone composition with the desired release performance will not result.

The epoxy functional silicones comprising the coating composition of the instant invention are selected from the group consisting of $MD_xD^E_yQ_zT_uD^{Rf}_jD^A_kD^P_l(D'(CH(R)CH_2O)_m)_nD^B_pM$, $M^ED_xD^E_yQ_zT_uD^{Rf}_jD^A_kD^P_l(D'(CH(R)CH_2O)_m)_nD^B_pM^E$, $M^ED_xD^E_yQ_zT_uD^{Rf}_jD^A_kD^P_l(D'(CH(R)CH_2O)_m)_nD^B_pM$, and mixtures thereof;

where $M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_g)((CH_3)(CH_2)_h)SiO_{2/2}$,
$D^E=(C_6H_9O(CH_2)_2)(CH_3)SiO_{2/2}$,
$D^R_f=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, where R is selected from the group consisting of hydrogen, methyl, and ethyl, and where j, k, l, m, n, p, x, y, z, and u are positive integers and g, h, k, l, n, p, u and z may be zero or positive integers and wherein said epoxy functional silicone has a viscosity ranging from about 100 to about 100,000 centistokes at 25° C. The subscripts on the various components of the epoxyfunctional silicones may be varied at will within the constraints already listed, i.e. either non-zero or optionally zero such that the viscosity is within the defined range. This viscosity can exceed the ability of most coating technology to utilize the high viscosity epoxy functionalized silicone in an undiluted form. Most diluents will have a tendency to lower the cross-link density and cure speed of the cured silicone. Therefore selecting a diluent that lowers the viscosity of the silicone coating composition while essentially maintaining the cross-link density and speed of photo-cure of the cured silicone composition becomes essential to being able to utilize the higher viscosity epoxy functionalized silicones. An additional consideration regarding the choice of diluent is that the curing catalyst must remain miscible with the silicone diluent mixture. Typical diluents slow the cure rate by one of two phenomena, either a dilution effect or an intrinsically slower cure rate; the combination of both effects is undesirable.

Carbinol containing polydiorganosiloxanes may be prepared by the reaction of an olefin with a hydrogen containing siloxane where the hydrogen is active for the hydrosilylation reaction. An example of such a preparative scheme is illustrated by the following reaction:

$$R^1R^2C=CR^3R^4 + \equiv Si-H \rightarrow \equiv Si-R^1R^2C-CHR^3-R^4$$

where $R^1$, $R^2$ and $R^3$ are monovalent radicals selected from the group consisting of hydrogen, one to forty carbon monovalent hydrocarbon radicals, and trifluoropropyl and $R^4$ is a monovalent hydrocarbon radical selected from the group of monovalent radicals having the formula:

$$C_aH_{2a+1-b}G_\theta A(OH)_b,$$

with the subscript a an integer of one or greater and the subscript b a positive integer subject to the limitation that b is less than or equal to 2a+1; and $$C_cH_{2c-7-d}G_\theta A(OH)_d,$$

with the subscript c being an integer 6 or greater and the subscript d a positive integer subject to the limitation that d is less than or equal to 2c−7, where $A=(((CH2)_\alpha O)_\beta ((CH2)_\gamma O)_\pi)$ where the subscripts $\alpha$, $\beta$, $\gamma$, and $\pi$ are zero or positive subject to the limitation that if $\alpha$ is zero $\beta$ is zero and subject to the limitation that if $\gamma$ is zero $\pi$ is zero and where $G_\theta$ is divalent O or divalent S and the subscript $\theta$ is zero or one. Preferably the subscripts b and d are each 2 or greater, more preferably 3 or greater, and most preferably four or greater.

The hydrogen functional siloxane precursor fluid, $\equiv$Si—H, may be any organohydrogensiloxane having the formula:

$$M_eM^H_fD_oD^H_qT_rT^H_sQ_t$$

where
$M=R^1R^2R^3SiO_{1/2}$,
$M^H=R^1R^2HSiO_{1/2}$,
$D=R^1R^2SiO_{2/2}$,
$D^H=R^1HSiO^{2/2}$,
$T=R^1SiO_{3/2}$,
$T^H=HSiO_{3/2}$, and
$Q=SiO_{4/2}$, with each $R^1$, $R^2$, and $R^3$ for each $M_e$, $M^H_f$, $D_p$, $D^H_q$, $T_r$, and $T^H_s$ independently selected as previously defined with the subscripts e, f, o, q, r, s and t being zero or positive subject to the limitation that at least one of the subscripts f, q, and s are non-zero and positive. The organohydrogensiloxane can also preferably be selected from the group consisting of tetrahydrotetramethylcyclotetrasiloxane, dimethylhydrogensiloxy chain stopped polydimethylmethylhydrogen siloxane, trimethylsiloxy chain stopped polydimethyl-methylhydrogen siloxane, and sym-tetramethyldisiloxane.

Hydrosilylation thus produces a carbinol containing siloxane of the general formula:

$$M_eM^C_fD_pD^C_qT_rT^C_sQ_t$$

where the subscripts e, f, o, q, r, s and t have the same values as the organohydrogensiloxane in the preceding hydrosilylation reaction, $M_e$, $D_p$, $T_r$ and $Q_t$ are the same and
$M^C=R^1R^2R^5SiO_{1/2}$,
$D^C=R^1R^5SiO_{2/2}$, and
$T^C=R^5SiO_{3/2}$, with
$R^5$ a monovalent radical having the formula —$R^1R^2C$—$CHR^3R^4$ where each $R^1$, $R^2$, and $R^3$ are independently selected as previously defined and R4 as previously defined. The choice of the starting olefinic carbinol, $R^1R^2C=CHR^3R^4$, governs the definition of $R^5$. It is emphasized that for each structural unit of the siloxane, M, $M^H$, D, $D^H$, T, $T^H$ and in the olefinic carbinol, $R^1R^2C=CHR^3R^4$, that each $R^1$, $R^2$, and $R^3$ are independently selected wherever they occur in a formula. The foregoing reaction describes the preparation of a carbinol containing silane or siloxane.

While the stoichiometric subscripts $\alpha$, $\beta$, $\gamma$, $\pi$, b, c, d, e, f, g, h, j, k, l, m, n, o, p, q, r, s, t, u, w, x, y, and z may be zero or positive integers in the case of pure compounds as previously defined in the context of pure compounds, it is to be noted that mixtures of compounds satisfying these various definitions may also be used, in which case the individual subscripts will necessarily assume a non-integral positive value representative of the average composition of the relevant mixture.

In general, the reactants are an olefinically unsaturated alcohol and a silyl hydride or organohydrogenpolysiloxane. When the alcohol only contains one hydroxyl functionality the carbinol containing silane or siloxane will contain only one alcohol functionality in the stopping radical. When the unsaturated alcohol contains more than one hydroxyl functionality, i.e. a di alcohol or a glycol or a tri-alcohol, or higher homologues, the carbinol stopping group will necessarily contain the greater number of hydroxyl groups, as they survive the hydrosilylation reaction. Thus this preparative scheme may be generalized to include progressively larger numbers of hydroxyl functionality in the olefinically unsaturated alcohol. Further, these olefinically unsaturated alcohols may contain more than one point of olefinic unsaturation within the molecule. While the species listed according to the formulas admit various isomers of alkyl hydrocarbon radicals, aromatic hydrocarbon radicals and alkylaromatic hydrocarbon radicals, other hydrocarbon radicals could be substituted as well such as fused ring aromatic radicals and alkyl derivatives of fused ring aromatic radicals. Thus curing of the combination system provided by the present invention results in the increasing the quantity of polydiorganosiloxane components present in the crosslink network.

The requirement for a prompt efficient photocure militates that photo initiators and photosensitizers be freely miscible with the photo-crosslinkable compositions in which they are mixed, preferably forming clear solutions, but at least forming stable suspensions or dispersions. In the case of the epoxy-functional photocurable silicones of the instant invention, onium-type cationic photo catalysts must be compatible with the epoxy-silicone fluid. Iodonium salts of the general formula [(R'-Ph)$_2$I]+X- wherein X=SbF$_6$, PF$_6$ or BF$_4$ and wherein R' is a C$_{(4-20)}$ organo radical selected from alkyl and haloalkyl and mixtures thereof have been designed to address the miscibility issue where R' is typically a mixture of various alkyl fragments derived from linear alkylate grade dodecylbenzene and generically called dodecyl although the mixture is not pure dodecyl. As a consequence of the impurity of the dodecylbenzene, the compounds exhibit a freezing point depression relative to the pure compound and thus tend to exist in a non-crystalline, amorphous, semi-fluid state that is compatible with the epoxy-silicones of the instant invention. These dodecylbenzene iodonium cationic photocure catalysts are thus well-suited for use as photo catalysts for the ultraviolet cured epoxy-silicone release systems. The hexafluoroantimonate salts are most preferred for the compositions of the instant invention because they tend to combine high activity with excellent miscibility.

The UV curable epoxy functional silicone compositions of the present invention can be applied to cellulosic and other substrates including paper, metal, foil, glass, PEK paper, SCK paper, and polyethylene, polypropylene and polyester films. A UV initiated reaction will cure the epoxy functional silicone compositions of the present invention and form a non-adherent, abhesive surface on the coated substrate.

Ultraviolet light curable silicone coating compositions of the present invention are obtained by combining an iodonium salt which is effective for catalyzing an ultraviolet light initiated cure reaction of the silicone coating composition, with a dialkylepoxysiloxy- or trialkylsiloxy- chain-stopped epoxy siloxane fluid having a viscosity of approximately 100 to 100,000 centistokes at 25° C.

The preferred UV-light initiator or photocatalyst utilized by the present invention is a diaryl iodonium salt derived from "linear alkylate" dodecylbenzene. Such salts have the following general formula:

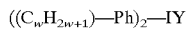

wherein w is an integer varying from about 6 to about 18, Y equals SbF$_6$, AsF$_6$, PF$_6$, or BF$_4$ and Ph stands for a phenyl group. These bis(4-dodecylphenyl) iodonium salts are very effective initiators for the UV cure of a wide range of epoxy functional silicones.

"Linear alkylate" dodecylbenzene is known commercially and is prepared by Friedel-Craft alkylation of benzene with a C$_6$–C$_{14}$ α-olefin cut. Consequently, the alkylate contains a preponderance of branched chain dodecylbenzene, but there may, in fact, be large amounts of other isomers of dodecylbenzene such as ethyldecylbenzene, plus isomer of undecylbenzene, tridecylbenzene and etc. Note, however, that such a mixture is responsible for the dispersive character of the linear alkylate derived catalyst and is an aid in keeping the material fluid. These catalysts are free-flowing viscous fluids at room temperature.

The bis-dodecylphenyl iodonium salts (II) are profoundly different from previously characterized diaryliodonium salts (I). They are both pentane-soluble and water-insoluble. The improvements in solubility and catalytic efficiency of these branched chain substituted salts are further underscored by comparison with analogous salts prepared from straight chain n-tridecylbenzene and n-dodecylbenzene. Two examples of these salts include bis(4-n-tridecylphenyl) iodonium hexafluoroantimonate which have a long linear hydrocarbon chains. These salts (I), in contrast to the new salts (II), are waxy which disperse very poorly in the epoxy functional silicones utilized by the coating compositions of the present invention. These catalysts afford very sluggish UV cures when utilized for release coatings.

The UV curable silicone coating compositions of the present invention utilize epoxy functional silicone fluids which can be prepared in several ways. Epoxy compounds containing both unsaturation and oxirane such as 4-vinylcyclohexeneoxide, react with silylhydride functional polysiloxanes via a hydrosilation reaction. An analogous hydrosilation reaction between vinyl siloxane groups and silylhydride functional polysiloxanes is a well-known means of crosslinking or curing silicone polymers. This reaction may be used to partially cross link silylhydride functional silicones and vinyl functional silicones creating thereby a lightly cross linked network structure. The presence of an initial excess of silylhydride groups relative to the vinyl siloxane reactant creates a polymer with residual silyl hydride groups that may undergo subsequent addition with unsaturated epoxy compounds to produce epoxy functional silicones.

The epoxy functional silicones can be prepared from other vinyl-or allylic-functional epoxy compounds containing olefinic moieties such as allylglycidylether or glycidyl acrylate, vinylnorbornene monoxide and dicyclopentadiene monoxide. Although cyclohexyl epoxy compounds are particularly useful, other vinyl-functional cycloaliphatic epoxy compounds may also be used without significantly altering the properties of the product. The scope of the invention is not limited to the epoxide species used in the examples.

The epoxy functional polysiloxane intermediate fluids can be prepared in any of several ways. The following examples illustrate several of these methods but it must be understood that the present inventions are not limited by these examples. Those skilled in the art will be able to provide other epoxy functional silicone intermediate fluids upon consideration of these examples. All U.S. patents referenced in this application are hereby and herewith incorporated by reference.

EXAMPLES

Representative Preparative Example 570 g of an organohydrogen siloxane of approximate formula M$^H$D$_{25}$M$^H$(R$^1$, R$^2$ and R$^3$ each independently methyl) were mixed with 2430 g of 3000 centistokes (measured at 25° C.) polydimethylsiloxane polymer, MD$_x$M, x sufficient to produce a viscosity of 3,000 centistokes (R$^1$, R$^2$ and R$^3$ each independently methyl) in the presence of 0.3 g linear phosphonitrilic chloride catalyst (LPNC). Agitation of this mixture at 60° C. for 4 hours followed by neutralization of the LPNC with MgO and subsequent filtration yielded a clear Si—H stopped silicone having 232 ppm hydrogen as Si—H, indicating an approximate formula of $M^H D_{115} M^H$, R's as previously defined. 2000 g of the silyl hydride so produced was then dispersed in 1000 g of toluene along with 40 g of a buffer solution consisting of 2% sodium acetate in a 1:1 methyl alcohol iso-propyl alcohol solvent mixture. 72 g of glycerine monoallylether was added followed by 0.4 g of Karstedt platinum catalyst solution which was agitated at 65° C. for 90 minutes. An exothermic temperature response was observed. At the conclusion of the 90 minute reaction period no Si—H was detectable by Fourier Transform Infra-Red (FTIR) spectroscopy. The reaction mixture was subjected to a vacuum to strip volatiles from the preparation at 160° C. under nitrogen and subsequently filtered to yield a product having a viscosity of 1167 centistokes and a solids content of 99.3%, as measured by weight loss after 45 minutes at 150° C. The molecular structure of this polymer is approximately $M^C D_{115} M^C$ where $M^C$ has the following structure:

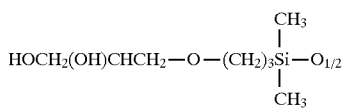

Mixtures of this polymer, $M^C D_{115} M^C$, (E) and several other analogous carbinol functionalized polydimethylsiloxanes of various molecular weights (A, B, C, and D) were co-cured with epoxy silicone polymers by studying the photocure response of catalyzed mixtures applied as 0.5 mil thick coatings on polyethylene kraft (PEK) liner substrate samples, then exposed to focused ultraviolet (UV) light from 2 Hanovia medium pressure mercury vapor UV lamps mounted in an RPC Laboratories UV processor unit. The combination of minimal total nominal lamp power and maximum conveyor line speed where the silicone coatings were cured to smear-free and migration-free abhesive release surfaces with good anchorage to the PEK sheets was ascertained for each mixture of carbinol containing plus epoxy-functional silicone with 2 parts of a catalyst package consisting of about 50 weight percent $(C_{12}H_{25}(C_6H_5))_2 I^+$ $SbF_6^-$ plus 2% iso-propylthioxanthone sensitizer in an alkylglycidylether reactive diluent added per 100 parts of silicone mixture. Table 1 presents results for the carbinol containing polymers studied in this fashion.

TABLE 1

PROPERTIES OF $M^C D_x M^C$ POLYMERS

| EXAMPLE | VISCOSITY (cstk) | CHAINLENGTH x | HYDROXY EQ. WT.* |
|---|---|---|---|
| A | 530 | 75 | 1487 |
| B | 300 | 50 | 1000 |
| C | 980 | 100 | 1916 |

TABLE 1-continued

PROPERTIES OF $M^C D_x M^C$ POLYMERS

| EXAMPLE | VISCOSITY (cstk) | CHAINLENGTH x | HYDROXY EQ. WT.* |
|---|---|---|---|
| D | 15450 | 155 | 2934 |
| E | 1167 | 115 | 2227 |

*Hydroxy equivalent weight refers to the mass of polymer containing one mole of hydroxyl group (as carbinol) functionality. It should be noted that di-carbinol containing (a variety of carbinol functionalized silicones) polymers contain 4 hydroxyl sites, 2 at each end of the linear molecule. Despite the presence of the buffer which helps to quell the SiH + ROH → SiOR + $H_2$ side reaction (catalyzed by platinum catalysts along with the hydrosilylation reaction) some degree of this cross-linking reaction occurs, which explains the higher than expected viscosity of each polymer.

Mixtures of these polymers with linear epoxy silicone polymers of the general structure, $M^E D_x D^E_y M^E$, with $M^E$, D, and $D^E$, as previously defined, were prepared. Two different epoxy silicones were used, example F with an epoxy equivalent weight of 1100 and example G with an epoxy equivalent weight of 1325. The following blends as shown in Table 2 wee assembled.

TABLE 2

EPOXY SILICONE BLENDS

| MIX | COMPOSITION | MOLE RATIO, OH to OXIRANE |
|---|---|---|
| 1 | 50% G + 50% A | 1:1.12 |
| 2 | 75% G + 25% A | 1:1.68 |
| 3 | 59% G + 41% B | 1:1.09 |
| 4 | 74% G + 26% B | 1:2.15 |
| 5 | 50% F + 50% C | 1:1.75 |
| 6 | 75% F + 25% C | 1:5.23 |
| 7 | 67% F + 33% D | 1:5.45 |
| 8 | 50% F + 50% E | 1:3.04 |
| 9 | 75% F + 25% E | 1:6.20 |

In all nine cases a clear, compatible one phase mixture of the two polysiloxanes was observed prior to the introduction of the photo-catalyst solution. Relative qualitative cure assessment of each catalyzed blend, along with control baths of F and G alone, is tabulated in Table 3.

TABLE 3

CURE ASSESSMENT OF EPOXY SILICONES BLENDED WITH CARBINOL CONTAINING SILICONES

| MIX | LAMP POWER (watt/in.$^2$) | CONVEYOR SPEED (ft./min.) | UV DOSE (mJ/cm$^2$)* |
|---|---|---|---|
| F | 300 | 400 | 24 |
| G | 300 | 400 | 24 |
| 1 | 400 | 300 | 45 |
| 2 | 400 | 400 | 32 |
| 3 | 600 | 150 | 135 |
| 4 | 400 | 400 | 32 |
| 5 | 400 | 400 | 32 |
| 6 | 300 | 400 | 24 |
| 7 | 300 | 400 | 24 |
| 8 | 300 | 300 | 32 |
| 9 | 300 | 400 | 24 |
| B(no cure) | na | na | na |

*UV dose was determined with EIT Uvimap ™ photometer for given machine conditions.

Photocure response in this series is related to the mole ratio of hydroxyl groups to epoxy (oxirane) groups. Cationic photocure efficiency is rapidly lost as the hydroxyl to epoxy group ratio approaches one. In these examples, there is no loss of cure speed at hydroxyl to epoxy ratios of 1.5 or less. It should be noted that di-carbinol containing silicones will not photo-absence of epoxy-containing polymers or oligomers. These data demonstrate that carbinol functionalized silicones are both miscible and co-photo-curable with epoxy functional silicones.

The following examples demonstrate the release characteristics of blends of carbinol functionalized silicones with epoxy functional silicones compared to epoxy functional silicones alone.

Several coating baths were prepared each using 2 parts of the iodonium catalyst solution previously described per 100 parts of total silicone. Each bath was coated to a coatweight of about 0.8 g/m$^2$ on PEK substrate using a lab Euclid solventless silicone coating device. Coated sheet were passed through the RPC lab UV processor once at 400 watts/in.$^2$ total lamp power at 150 fpm conveyor speed to effect complete cure of each coating. Two TESA 7574 acrylic test tapes were affixed to each coating and aged for 20 hours at 70° C. prior to measuring the release force to pull the acrylic tape from the silicone coating at a pull speed of 50 in./min. The results are presented in table 4.

TABLE 4

RELEASE FORCE MEASUREMENTS: TESA 7574

| COATING BATH | RELEASE FORCE (g/2 in.) |
|---|---|
| 100% F (control) | 100, 100* |
| 83% F + 17% C | 52, 52 |
| 75% F + 25% C | 56, 36 |
| 50% F + 50% C | 62, 72 (slightly smeary cure) |

*zippy type release

Using a more aggressive acrylic tape, TESA 4970 led to slightly different results, as reported in Table 5.

TABLE 5

RELEASE FORCE MEASUREMENTS: TESA 4970

| COATING BATH | RELEASE FORCE (g/2 in.) |
|---|---|
| 100% F (control) | 160, 160* |
| 90% F + 10% E | 104, 96 |
| 90% F + 10% C | 120, 104 |
| 75% F + 25% E | 80, 100 |
| 75% F + 25% C | 84, 76 |

*zippy type release

These results indicate that lower and smoother release is obtained in blends of the carbinol functionalized silicone with the epoxy functionalized silicone as compared to the epoxy functionalized silicone alone.

Another coating trial was carried out using blends of polymer F and polymer E applied to PEK liner. A coatweight of 1.2 g/m$^2$ was applied using a Dixon coater with cure effected by exposure to 2 banks of 300 watt/in.$^2$ Fusion Systems "H" microwave-fired UV lamps at 50 fpm line speed. The cured silicone coatings so prepared were laminated with Ashland 1085 solvent borne acrylic pressure sensitive adhesive (PSA), then facestock was applied to the cured PSA. The release force required to separate the PEK/silicone laminate from the PSA/facestock laminate was measured by cutting the laminates into 2 inch wide strips and measuring the force required for separation at a strip speed of 400 in./min. after aging the laminates for a day at ambient conditions. The results are tabulated in Table 6.

TABLE 6

RELEASE FORCE MEASUREMENTS

| COATING BATH | RELEASE FORCE (g/2 in.) |
|---|---|
| F (control) | 25 |
| 90% F + 10% E | 20 |
| 75% F + 25% E | 20* |
| 67% F + 33% E | 21* |

*exceptionally smooth release

These results show a significant improvement in release obtained by using the carbinol functionalized silicone.

Additional coating baths were prepared for application to PEK liners summarized in Table 7.

TABLE 7

EPOXY SILICONE BLENDS

| MIX | POLYMER COMPOSITION | OH/OXIRANE MOLE RATIO |
|---|---|---|
| 10 | 90% G + 10% E | 1:15 |
| 11 | 83% G + 17% E | 1:10 |
| 12 | 90% F + 10% E | 1:18 |
| 13 | 83% F + 17% E | 1:12 |

The same iodonium photo-catalyst as previously described was used, the mixture coated to a weight of 1.2 g/m$^2$ on PEK liner and cure was effected by exposure to 2 Fusion 600 watt/in.$^2$ "H" type UV lamps at a web speed of 800 fpm. Samples of each cured coating, along with control coatings of polymer F and G alone, were laminated with Ashland solvent borne acrylic PSA and the release was subsequently determined as a function of peel speed after a week of aging at ambient conditions (as previously described), Table 8.

TABLE 8

RELEASE FORCE AS FUNCTION OF STRIP SPEED AND COMPOSITION OF SILICONE

| MIX | 0.05 m/s g/2 in. | 0.05* g/2 in. | 0.5 g/2 in. | 1.0 g/2 in. | 2.5 g/2 in. | 2.5* g/2 in. |
|---|---|---|---|---|---|---|
| G | 23 | 24 | 28 | 32 | 35 | 65 |
| 10 | 17 | 24 | 32 | 42 | 52 | 138 |
| 11 | 20 | 29 | 41 | 53 | 66 | 193 |
| F | 30 | 23 | 33 | 35 | 36 | 68 |
| 12 | 27 | 34 | 45 | 53 | 62 | 127 |
| 13 | 23 | 37 | 47 | 54 | 66 | 132 |

The most significant advantage seen for incorporation of the carbinol functionalized silicone into the coating bath is that at higher peel speeds the release force is considerably increased, which has the advantage of preventing premature dispensing of labels during high speed converting processes. Additional formulations were prepared to determine the effect of carbinol functionalized silicone concentration in the coating bath on this property. Three additional compositions were prepared, Table 9.

TABLE 9

CARBINOL EPOXY FUNCTIONAL SILICONE BLENDS

| MIX | COMPOSITION |
|---|---|
| F | CONTROL |
| 12 | 90% F + 10% E |
| 14 | 95% F + 5% E |
| 15 | 98% F + 2% E |

As previously described these compositions were catalyzed, coated and cured and evaluated for release force, Table 10.

TABLE 10

RELEASE FORCE AS FUNCTION OF STRIP SPEED AND COMPOSITION OF SILICONE

| MIX | 0.05 m/s g/2 in. | 0.17 g/2 in. | 0.5 g/2 in. | 1.5 g/2 in. | 3.0 g/2 in. |
|---|---|---|---|---|---|
| F | 21 | 27 | 22 | 26 | 25 |
| 12 | 16 | 24 | 25 | 32 | 35 |
| 14 | 17 | 27 | 26 | 38 | 36 |
| 15 | 19 | 28 | 27 | 33 | 35 |

Even though the concentration of the carbinol functionalized silicone has been lowered, the mixture still displays the desired release versus peel speed characteristics.

Preparation of Polymer H 180 g of a polymer of approximate structure $M^H D_{120} M^H$, having 0.4 mole hydrogen as Si—H, was weighed into a 500 cc reaction flask with 7.0 g of trimethylolpropane-mono-allylether (0.04 mole), 40 g toluene, 40 g methylethylketone, and 2 drops of Karstedt's catalyst solution (previously described) with agitation and heating at 60°–70° C. for 2 hours. At conclusion of the 2 hour reaction period no Si—H was detectable by FTIR spectroscopy. Removal of solvent and volatile siloxane by-products left 182 g of 1600 centistokes product of approximate formula $M^{C*} D_{120} M^{C*}$ with a hydroxy equivalent weight of 2340 where $M^{C*}$ has the structure

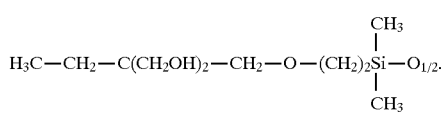

The carbinol functionalized silicone (H) prepared by the foregoing reaction was mixed on a one to one weight basis with an epoxy functionalized polymer to determine miscibility and efficacy of photocure. Then various blends of carbinol functionalized polymer H with epoxy functionalized polymer F were prepared. The blends were evaluated for photo-cure response, Table 11.

TABLE 11

PHOTO-CURE RESPONSE OF CARBINOL FUNCTIONALIZED SILICONES BLENDED WITH EPOXY FUNCTIONALIZED SILICONES

| MIX | COMPOSITION wt. % | OH TO OXIRANE MOLE RATIO | LAMP POWER, watt/in.² | CONVEYOR SPEED, fpm | UV DOSE mJ/cm² |
|---|---|---|---|---|---|
| F | 100 | na | 300 | 400 | 24 |
| 16 | 50/50 F/H | 1:2.13 | 300 | 400 | 32 |
| 17 | 25/75 F/H | 1:6.37 | 300 | 300 | 24 |
| 18 | 90/10 F/H | 1:19 | 300 | 400 | 24 |
| 19 | 95/5 F/H | 1:40 | 300 | 400 | 24 |
| 20 | 98/2 F/H | 1:103 | 300 | 400 | 24 |

These results demonstrate that blends of F and H have approximately the same photocure response as blends of E and F.

A polymer I was synthesized that was the exact analog of polymer H except that the carbinol functionalizing chain-stopper $M^{C*}$ was replaced with a mono-epoxy chainstopper such that polymer I had the formula: $M^E D_{120} M^E$. Blends were prepared as follows: mix 21 a 92 parts by weight F, 8 parts by weight H, and 2 parts by weight photo-catalyst blend and mix 22 a 92 parts by weight F, 8 parts by weight I, and 2 parts by weight photo-catalyst blend. These two blends were coated onto 44 lb./ream PEK liner to a 1 g/m² coatweight at 800 fpm line speed with cure effected by exposure to either to 2 banks or 1 bank of 600 watt/in.² Fusion "H" UV lamps. Mix 21 cured to a tight, smear-free and migration-free release surface on exposure to one bank of lamps at this line speed. In contrast, mix 22 smeared and migrated upon exposure to only one bank of lamps, requiring two banks of lamps to achieve same level of cure as mix 21. These results demonstrate that mixtures of carbinol functionalized silicones with epoxy functionalized silicones provide superior photocurability.

A blend of epoxy functionalized silicones, J, that provide a tight or tight and zippy release with an initiation spike was prepared using 60 wt. % $MM^E TQ$ and 40 wt. % $M^E D_{25} M^E$ (as taught in U.S. Pat. No. 5,360,833). Several blends with the tight release blend, J, and the premium or low release polymer H were prepared and evaluated for release characteristics after being coated onto PEK liner at 1.1 g/m² coatweight at 100 fpm using a 3 roll offset gravure 12 inch Dixon coater and cured by exposure to 1 bank of Fusion "H" 300 watt/in.² UV lamps. Ashland 1085 solvent borne acrylic PSA was applied atop the cured silicone, an SCK facestock applied to the adhesive layer then p2 inch strips were prepared for adhesive testing. Release was measured at 5 and 28 days after lamination, at release pull of 400 inches per minute of the release lamina away from the adhesive lamina, Table 12.

TABLE 12

MODIFICATION OF TIGHT RELEASE EPOXY
FUNCTIONALIZED SILICONES WITH CARBINOL
FUNCTIONALIZED SILICONES

| | BLEND COMPOSITION, parts by weight | | | | PROPERTIES | | |
|---|---|---|---|---|---|---|---|
| MIX | J | H | F | Catalyst | 5 Day Release, g/2 in. | Remarks | 28 Day Release g/2 in. |
| 23 | 100 | 0 | 0 | 2 | 406 | very zippy | 436 |
| 24 | 0 | 0 | 100 | 2 | 32 | slightly zippy | 38 |
| 25 | 95 | 5 | 0 | 2 | 183 | smooth | 197 |
| 26 | 90 | 10 | 0 | 2 | 112 | smooth | 127 |
| 27 | 90 | 5 | 5 | 2 | 136 | smooth | 147 |
| 28 | 80 | 10 | 10 | 2 | 95 | smooth | 113 |

These results demonstrate that incorporation of carbinol functionalized into epoxy functionalized silicone compositions that provide a tight and zippy release eliminates the zippy character of the tight release, rendering the release properties both tight and smooth.

Inclusion of the carbinol functional silicone lowers the release force of epoxy silicone compositions relative to epoxy silicone compositions that do not contain such carbinol functional silicones.

Having described the invention that which is claimed is:

1. A photo-curable epoxy silicone composition comprising:
    (a) an epoxy functional silicone;
    (b) a carbinol containing siloxane of the general formula:

$$M_{eM}{}^C{}_f D_o D^C{}_q T_r T^C{}_s Q_t$$

with the subscripts e, f, o, q, r, s and t being zero or positive subject to the limitation that at least one of the subscripts f, q, and s are non-zero and positive, where $Q=SiO^{4/2}$;
    $M=R^1R^2R^3SiO_{1/2}$,
        with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;
    $M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;
    $D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;
    $D^C=R^1R^5SiO^{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;
    $T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;
    $T^C=R^5SiO^{3/2}$, with
        $R^5$ a monovalent radical, independently selected for each $M^C$, $D^C$, and $T^C$, having the formula:

$$-R^1R^2C-CHR^3R^4$$

where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

$$C_aH_{2a+1-b}G_\theta A(OH)_b,$$

with the subscript a an integer of one or greater and the subscript b a positive integer subject to the limitation that b is less than or equal to 2a+1 and where $G_\theta$ is divalent O or divalent S and the subscript $\theta$ is zero or one; and $$C_cH_{2c-7-d}G_\theta A(OH)_d,$$

with the subscript c being an integer 6 or greater and the subscript d a positive integer subject to the limitation that d is less than or equal to 2c−7, where $$A=(((CH2)_\alpha O)_\beta ((CH2)_\gamma O)_\pi)$$

where the subscripts $\alpha$, $\beta$, $\gamma$, and $\pi$ are zero or positive subject to the limitation that if $\alpha$ is zero, $\beta$ is zero and subject to the limitation that if $\gamma$ is zero, $\pi$ is zero; and
    (c) a photo-catalyst.

2. The photo curable epoxy silicone composition of claim 1 wherein the epoxy functional silicone is selected from the group consisting of $MD_xD^E{}_yQ_zT_uD^{Rf}{}_jD^A{}_kD^P{}_l(D'(CH(R)CH_2O)_m)_nD^B{}_pM$,
$M^ED_xD^E{}_yQ_zT_uD^{Rf}{}_jD^A{}_kD^P{}_l(D'(CH(R)CH_2O)_m)_nD^B{}_pM^E$,
$M^ED_xD^E{}_yQ_zT_uD^{Rf}{}_jD^A{}_kD^P{}_l(D'(CH(R)CH_2O)_m)_nD^B{}_pM$, and mixtures thereof;
where
    $M=(CH_3)_3SiO_{1/2}$,
    $M^E=(C_6H_9O(CH_2)_2)(CH_3)_2SiO_{1/2}$,
    $D=(CH_3)_2SiO_{2/2}$,
    $D'=((CH_3)(CH_2)_g)((CH_3)(CH_2)_h)SiO_{2/2}$,
    $D^E=(C_6H_9O(CH_2)_2)(CH_3)SiO_{2/2}$,
    $D^R{}_f=(CF_3CH_2CH_2)(CH_3)SiO_{2/2}$,
    $D^A=((HO)(C_2H_3COO)C_6H_9(CH_2)_2)(CH_3)SiO_{2/2}$,
    $D^P=((HO)(C_6H_4)(CH_2)_3)(CH_3)SiO_{2/2}$,
    $D^B=((C_6H_5COO)(HO)(C_6H_9)(CH_2)_2)(CH_3)SiO_{2/2}$,
    $Q=SiO_{4/2}$,
    $T=(CH_3)_3SiO_{3/2}$,
    where R is selected from the group consisting of hydrogen, methyl, and ethyl, and where j, k, l, m, n, p, x, y, z, and u are positive integers and g, h, k, l, n, p, u and z may be zero or positive integers and wherein said epoxy functional silicone has a viscosity ranging from about 100 to about 100,000 centistokes at 25° C.

3. The composition of claim 2 wherein the photo-catalyst is selected from the group consisting of $((C_wH_{2w+1})—Ph)_2—I^+Y^-$ wherein w is an integer varying from about 6 to about 18, Y is selected from the group consisting of $SbF_6$, $AsF_6$, $PF_6$, and $BF_4$ and Ph stands for a phenyl group.

4. The composition of claim 3 wherein the subscript f is positive.

5. The composition of claim 4 wherein both $R^1$ and $R^2$ are methyl.

6. The composition of claim 5 wherein $R^4$ has the formula:

$$C_aH_{2a+1-b}G_\theta A(OH)_b.$$

7. The composition of claim 6 where θ is one.

8. The composition of claim 7 where G is oxygen.

9. The composition of claim 8 wherein the subscript b is 2 or greater.

10. A photo-curable epoxy silicone composition consisting essentially of:

(a) an epoxy functional silicone;
(b) a carbinol containing siloxane of the general formula:

$$M_eM^C_fD_oD^C_qT_rT^C_sQ_t$$

with the subscripts e, f, o, q, r, s and t being zero or positive subject to the limitation that at least one of the subscripts f, q, and s are non-zero and positive, where $Q=SiO_{4/2}$;
$M=R^1R^2R^3SiO_{1/2}$,
with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;

$M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;

$D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;

$D^C=R^1R^5SiO^{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;

$T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;

$T^C=R^5SiO^{3/2}$, with $R^5$ a monovalent radical, independently selected for each $M^C$, $D^C$, and $T^C$, having the formula:

$$-R^1R^2C-CHR^3R^4$$

where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

$$C_aH_{2a+1-b}A(OH)_b,$$

with the subscript a an integer of one or greater and the subscript b a positive integer subject to the limitation that b is less than or equal to 2a+1; and $$C_cH_{2c-7-d}A(OH)_d,$$

with the subscript c being an integer 6 or greater and the subscript d a positive integer subject to the limitation that d is less than or equal to 2c−7, where $$A=(((CH2)_\alpha O)_\beta((CH2)_\gamma O)_\pi)$$

where the subscripts α, β, γ, and π are zero or positive subject to the limitation that if α is zero β is zero and subject to the limitation that if γ is zero π is zero; and (c) a photo-catalyst.

11. A process for lowering the release force of a silicone release composition comprising:

(a) preparing an epoxy silicone selected from the group of epoxy silicones consisting of:

$MD_xD^E_yQ_zT_uD^{Rf}_jD^A_kD^P_l(D'(CH(R)CH_2O)_m)_nD^B_pM$,
$M^ED_xD^E_yQ_zT_uD^{Rf}_jD^A_kD^P_l(D'(CH(R)CH_2O)_m)_nD^B_pM^E$,
$M^ED_xD^E_yQ_zT_uD^{Rf}_jD^A_kD^P_l(D'(CH(R)CH_2O)_m)_nD^B_pM$, and mixtures thereof;
where
$M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_g)((CH_3)(CH_2)_h)SiO_{2/2}$,
$D^E=(C_6H_9O(CH_2)_2)(CH_3)SiO_{2/2}$,
$D^R_f=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, where R is selected from the group consisting of hydrogen, methyl, and ethyl, and where j, k, l, m, n, p, x, y, z, and u are positive integers and g, h, k, l, n, p, u and z may be zero or positive integers;

(b) preparing a carbinol functional silicone having the formula:

$$M_eM^C_fD_oD^C_qT_rT^C_sQ_t$$

with the subscripts e, f, o, q, r, s and t being zero or positive subject to the limitation that at least one of the subscripts f, q, and s are non-zero and positive, where $Q=SiO_{4/2}$;
$M=R^1R^2R^3SiO_{1/2}$,
with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;

$M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;

$D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;

$D^C=R^1R^5SiO^{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;

$T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;

$T^C=R^5SiO^{3/2}$, with $R^5$ a monovalent radical, independently selected for each $M^C$, $D^C$, and $T^C$, having the formula:

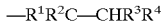
—$R^1R^2C$—$CHR^3R^4$ where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

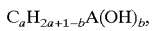
$C_aH_{2a+1-b}A(OH)_b$, with the subscript a an integer of one or greater and the subscript b a positive integer subject to the limitation that b is less than or equal to 2a+1; and

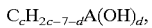
$C_cH_{2c-7-d}A(OH)_d$, with the subscript c being an integer 6 or greater and the subscript d a positive integer subject to the limitation that d is less than or equal to 2c−7, where

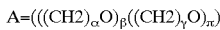
$A=(((CH2)_\alpha O)_\beta ((CH2)_\gamma O)_\pi)$ where the subscripts $\alpha$, $\beta$, $\gamma$, and $\pi$ are zero or positive subject to the limitation that if $\alpha$ is zero $\beta$ is zero and subject to the limitation that if $\gamma$ is zero $\pi$ is zero; and (c) adding said carbinol functional silicone to said epoxy silicone producing thereby a silicone mixture;

(d) adding a photo-catalyst to said silicone mixture; and (e) irradiating said silicone mixture comprising a photo-catalyst with ultraviolet radiation or an electron beam thereby curing said silicone mixture whereby release force of the cured silicone mixture is lowered.

12. The process of claim 11 wherein the photo-catalyst is selected from the group consisting of $((C_wH_{2w+1})$—$Ph)_2$—$I^+Y^-$ wherein w is an integer varying from about 6 to about 18, Y is selected from the group consisting of $SbF_6$, $AsF_6$, $PF_6$, and $BF_4$ and Ph stands for a phenyl group.

13. The process of claim 12 wherein the subscript f is positive.

14. The process of claim 13 wherein both $R^1$ and $R^2$ are methyl.

15. The process of claim 14 wherein $R^4$ has the formula:

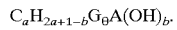
$C_aH_{2a+1-b}G_\theta A(OH)_b$.

16. The process of claim 15 where $\theta$ is one.

17. The process of claim 18 where G is oxygen.

18. The process of claim 19 wherein the subscript b is 2 or greater.

19. A cured epoxy silicone composition comprising the reaction product of:

(a) an epoxy functional silicone; and (b) a carbinol containing siloxane of the general formula:

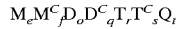
$M_eM^C_fD_oD^C_qT_rT^C_sQ_t$ with the subscripts e, f, o, q, r, s and t being zero or positive subject to the limitation that at least one of the subscripts f, q, and s are non-zero and positive, where $Q=SiO^{4/2}$;

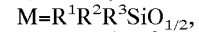
$M=R^1R^2R^3SiO_{1/2}$, with $R^1$, $R^2$ and $R^3$ each monovalent radicals and each independently selected, independent of the choice of $R^1$ and $R^2$ for $M^C$, D, $D^C$, and T from the group consisting of hydrogen, one to forty carbon monovalent hydrocarbon radicals, and trifluoropropyl;

$M^C=R^1R^2R^5SiO_{1/2}$, with $R^1$ and $R^2$ each monovalent radicals and each independently selected, independent of the choice of $R^1$ and $R^2$ for M, D, $D^C$, and T, from the group consisting of hydrogen, one to forty carbon monovalent hydrocarbon radicals, and trifluoropropyl;

$D=R^1R^2SiO_{2/2}$, with $R^1$ and $R^2$ each monovalent radicals and each independently selected, independent of the choice of $R^1$ and $R^2$ for M, $M^C$, $D^C$, and T, from the group consisting of hydrogen, one to forty carbon monovalent hydrocarbon radicals, and trifluoropropyl;

$D^C=R^1R^5SiO^{2/2}$, with $R^1$ a monovalent radical independently selected, independent of the choice of $R^1$ for M, $M^C$, D, and T, from the group consisting of hydrogen, one to forty carbon monovalent hydrocarbon radicals, and trifluoropropyl;

$T=R^1SiO_{3/2}$, with $R^1$ a monovalent radicals independently selected, independent of the choice of $R^1$ for M, $M^C$, D, and $D^C$, from the group consisting of hydrogen, one to forty carbon monovalent hydrocarbon radicals, and trifluoropropyl;

$T^C=R^5SiO^{3/2}$, with $R^5$ a monovalent radical, independently selected for each $M^C$, $D^C$, and $T^C$, having the formula:

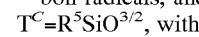
—$R^1R^2C$—$CHR^3R^4$ where each $R^1$, $R^2$, and $R^3$ are independently selected, independent of the choice of $R^1$, $R^2$ and $R^3$ for M, $M^C$, D, $D^C$, and T, from the group consisting of hydrogen, one to forty carbon monovalent hydrocarbon radicals, and trifluoropropyl; and $R^4$ a monovalent hydrocarbon radical selected from the group of monovalent radicals having the formula:

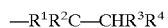
$C_aH_{2a+1-b}A(OH)_b$, with the subscript a an integer of one or greater and the subscript b a positive integer subject to the limitation that b is less than or equal to 2a+1; and $C_cH_{2c-7-d}A(OH)_d$, with the subscript c being an integer 6 or greater and the subscript d a positive integer subject to the limitation that d is less than or equal to 2c−7, where $A=(((CH2)_\alpha O)_\beta((CH2)_\gamma O)_\pi)$ where the subscripts $\alpha$, $\beta$, $\gamma$, and $\pi$ are zero or positive subject to the limitation that if $\alpha$ is zero $\beta$ is zero and subject to the limitation that if $\gamma$ is zero $\pi$ is zero.

20. The cured epoxy silicone composition of claim 19 wherein the epoxy functional silicone is selected from the group consisting of:

$MD^E_yQ_zT_uD^{Rf}_jD^A_kD^P_l(D'(CH(R)CH_2O)_m)_nD^B_pM$,
$M^ED_xD^E_yQ_zT_uD^{Rf}_jD^A_kD^P_l(D'(CH(R)CH_2O)_m)_nD^B_pM^E$,
$M^ED_xD^E_yQ_zT_uD^{Rf}_jD^A_kD^P_l(D'(CH(R)CH_2O)_m)_nD^B_pM$,
and mixtures thereof;

where
$M=(CH_3)_3SiO_{1/2}$,
$M^E=(C_6H_9O(CH_2)_2)(CH_3)_2SiO_{1/2}$,
$D=(CH_3)_2SiO_{2/2}$,
$D'=((CH_3)(CH_2)_g)((CH_3)(CH_2)_h)SiO_{2/2}$,
$D^E=(C_6H_9O(CH_2)_2)(CH_3)SiO_{2/2}$,
$D^R_f=(CF_3CH_2CH_2)(CH_3)SiO_{2/2}$,
$D^A=((HO)(C_2H_3COO)C_6H_9(CH_2)_2)(CH_3)SiO_{2/2}$,
$D^P=((HO)(C_6H_4)(CH_2)_3)(CH_3)SiO_{2/2}$,
$D^B=((C_6H_5COO)(HO)(C_6H_9)(CH_2)_2)(CH_3)SiO_{2/2}$,
$Q=SiO_{4/2}$,
$T=(CH_3)_3SiO_{3/2}$, where R is selected from the group consisting of hydrogen, methyl, and ethyl, and where j, k, l, m, n, p, x, y, z, and u are positive integers and g, h, k, l, n, p, u and z may be zero or positive integers.

* * * * *

UNITED STATES PATENT AND TRADEMARK OFFICE
CERTIFICATE OF CORRECTION

PATENT NO. : 5,814,679

DATED : September 29, 1998

INVENTOR(S) : Richard P. Eckberg, Robert F. Agars

It is certified that an error appears in the above-identified patent and that said Letters Patent is hereby corrected as shown below:

In Claim 1 Line 40 $Q=SiO^{4/2}$ should be $Q=SiO_{4/2}$.

Signed and Sealed this

Twenty-sixth Day of January, 1999

Attest:

Attesting Officer

*Acting Commissioner of Patents and Trademarks*